(12) United States Patent  (10) Patent No.: US 8,818,988 B1
Brown et al.  (45) Date of Patent: *Aug. 26, 2014

(54) DATABASE SYSTEM HAVING A REGULATOR TO PROVIDE FEEDBACK STATISTICS TO AN OPTIMIZER

(75) Inventors: Douglas P. Brown, Rancho Santa Fe, CA (US); Anita Richards, San Juan Capistrano, CA (US); Louis M. Burger, Escondido, CA (US); Stephen A. Brobst, Henderson, NV (US)

(73) Assignee: Teradata US, Inc., Dayton, OH (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/482,780

(22) Filed: Jun. 11, 2009

Related U.S. Application Data

(63) Continuation-in-part of application No. 11/027,896, filed on Dec. 30, 2004, which is a continuation-in-part of application No. 10/730,348, filed on Dec. 8, 2003, now Pat. No. 7,395,537.

(51) Int. Cl.
 *G06F 17/30* (2006.01)

(52) U.S. Cl.
 USPC .......................................... 707/713; 707/719

(58) Field of Classification Search
 CPC ..................................................... G06F 17/30
 USPC .............. 707/688, 713, 719, E17.017, 999.02
 See application file for complete search history.

(56) References Cited

U.S. PATENT DOCUMENTS

| 5,473,773 | A | 12/1995 | Aman |
| 5,537,542 | A | 7/1996 | Eilert |
| 5,675,797 | A | 10/1997 | Chung |
| 6,052,694 | A | 4/2000 | Bromberg |
| 6,338,072 | B1 * | 1/2002 | Durand et al. ................. 718/104 |
| 6,353,844 | B1 * | 3/2002 | Bitar et al. ..................... 718/102 |
| 6,718,358 | B1 | 4/2004 | Bigus |
| 6,950,848 | B1 | 9/2005 | Yousefi'zadeh |
| 7,146,353 | B2 | 12/2006 | Garg |
| 7,228,546 | B1 * | 6/2007 | McCarthy et al. ............ 718/104 |
| 2001/0034563 | A1 * | 10/2001 | Matsumoto et al. .......... 700/101 |
| 2002/0049608 | A1 * | 4/2002 | Hartsell et al. .................... 705/1 |
| 2002/0091746 | A1 * | 7/2002 | Umberger et al. ............ 709/105 |
| 2002/0095301 | A1 * | 7/2002 | Villena ............................. 705/1 |
| 2002/0103778 | A1 * | 8/2002 | Saxena .............................. 707/1 |

(Continued)

OTHER PUBLICATIONS

C. L. Liu and James W. Layland. 1973. Scheduling Algorithms for Multiprogramming in a Hard-Real-Time Environment. J. ACM 20, 1 (Jan. 1973), 46-61. DOI=10.1145/321738.321743 http://doi.acm.org/10.1145/321738.321743.*

(Continued)

*Primary Examiner* — Ajay Bhatia
*Assistant Examiner* — Randall Burns
(74) *Attorney, Agent, or Firm* — Trop, Pruner & Hu, P.C.; Randy L. Campbell, Jr.

(57) ABSTRACT

A database system includes an optimizer to generate resource estimates regarding execution of a request in the database system, and a regulator to monitor execution of a request and to adjust a priority level of the request based on the monitored execution and based on the resource estimates provided by the optimizer. The regulator is executable to further feed back statistics regarding execution of the request to the optimizer to improve accuracy of resource estimates provided by the optimizer.

22 Claims, 4 Drawing Sheets

(56) References Cited

U.S. PATENT DOCUMENTS

| | | | |
|---|---|---|---|
| 2002/0194173 A1* | 12/2002 | Bjornson et al. | 707/4 |
| 2002/0198867 A1* | 12/2002 | Lohman et al. | 707/3 |
| 2003/0002649 A1 | 1/2003 | Hettish | |
| 2003/0005028 A1 | 1/2003 | Dritschler | |
| 2003/0115429 A1* | 6/2003 | Olstad et al. | 711/158 |
| 2003/0135609 A1* | 7/2003 | Carlson et al. | 709/224 |
| 2003/0174651 A1* | 9/2003 | Morton | 370/235 |
| 2003/0233391 A1 | 12/2003 | Crawford, Jr. | |
| 2004/0002885 A1* | 1/2004 | Levy | 705/8 |
| 2004/0021678 A1 | 2/2004 | Ullah | |
| 2004/0117359 A1* | 6/2004 | Snodgrass et al. | 707/3 |
| 2004/0225631 A1 | 11/2004 | Elnaffar | |
| 2004/0236757 A1 | 11/2004 | Caccavale | |
| 2004/0243692 A1 | 12/2004 | Arnold | |
| 2005/0010558 A1* | 1/2005 | Dettinger et al. | 707/3 |
| 2005/0038789 A1 | 2/2005 | Chidambaran | |
| 2005/0038833 A1 | 2/2005 | Colrain | |
| 2005/0039183 A1 | 2/2005 | Romero | |
| 2005/0066326 A1 | 3/2005 | Herbeck | |
| 2005/0071307 A1* | 3/2005 | Snyder | 707/1 |
| 2005/0081210 A1* | 4/2005 | Day et al. | 718/104 |
| 2005/0125213 A1* | 6/2005 | Chen et al. | 703/22 |
| 2005/0262183 A1 | 11/2005 | Colrain | |
| 2007/0162426 A1* | 7/2007 | Brown et al. | 707/2 |
| 2008/0162417 A1 | 7/2008 | Morris | |
| 2008/0162418 A1 | 7/2008 | Morris | |
| 2008/0162419 A1 | 7/2008 | Brown | |
| 2008/0162583 A1 | 7/2008 | Brown | |
| 2008/0172419 A1 | 7/2008 | Richards | |

OTHER PUBLICATIONS

Finkelstein, Computer Science Department, Stanford University, "Common Expression Analysis in Database Applications," 1982, pp. 235-245.

Sellis, University of California, Berkeley, "Multiple-Query Optimization," ACM Transactions on Database Systems, vol. 13, No. 1, Mar. 1988, pp. 23-52.

U.S. Appl. No. 12/317,836 entitled "Database System Having a Service Level Goal Responsive Regulator" filed Dec. 30, 2008 (24 pages).

U.S. Appl. No. 12/317,985 entitled "Database System Having Regulator That Performs Workload Regulation Based on Optimizer Estimates" filed Dec. 30, 2008 (26 pages).

* cited by examiner

DATABASE SYSTEM HAVING A REGULATOR TO PROVIDE FEEDBACK STATISTICS TO AN OPTIMIZER

CROSS-REFERENCE TO RELATED APPLICATIONS

This is a continuation-in-part of U.S. Ser. No. 11/027,896, filed Dec. 30, 2004 (U.S. Patent Application Publication No. 2006/0026179), which is a continuation-in-part of U.S. Ser. No. 10/730,348, filed Dec. 8, 2003 (U.S. Pat. No. 7,395,537), which are each hereby incorporated by reference.

TECHNICAL FIELD

The invention relates generally to a database system having a regulator to provide feedback statistics to an optimizer to improve optimizer estimates.

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

There can be diverse types of workloads that can execute in a database management system. Some workloads may include low priority requests, such as background load requests or reporting requests. Another type of workload can include requests that are relatively complex. Yet other workloads include requests that have short durations but very high priorities. Yet another type of workload includes continuous or batch requests, which run for a relatively long time.

Conventional database management systems do not properly respond to various internal or external events that may impact performance of the various different types of workloads that may be concurrently running in the database management system. Examples of such internal or external events include unforeseen events (e.g., request volume surge, exhaustion of shared resources, component outages) or even planned situations (e.g., systems maintenance or data load). Also, conventional database management systems fail to properly consider the impact of inaccurate estimates provided by an optimizer in the database system on whether or not the database management system would be able to meet service level goals associated with the workloads.

SUMMARY

In general, according to an embodiment, a database system includes an optimizer to generate resource estimates regarding execution of a request in the database system, and a regulator to monitor execution of a request and to adjust a priority level of the request based on the monitored execution and based on the resource estimates provided by the optimizer in order to achieve a stated service level goals (SLGs). The regulator also feeds back statistics regarding execution of the request to the optimizer to improve accuracy of resource estimates provided by the optimizer.

Other or alternative features will become apparent from the following description, from the drawings, and from the claims.

DETAILED DESCRIPTION

Figure 1:
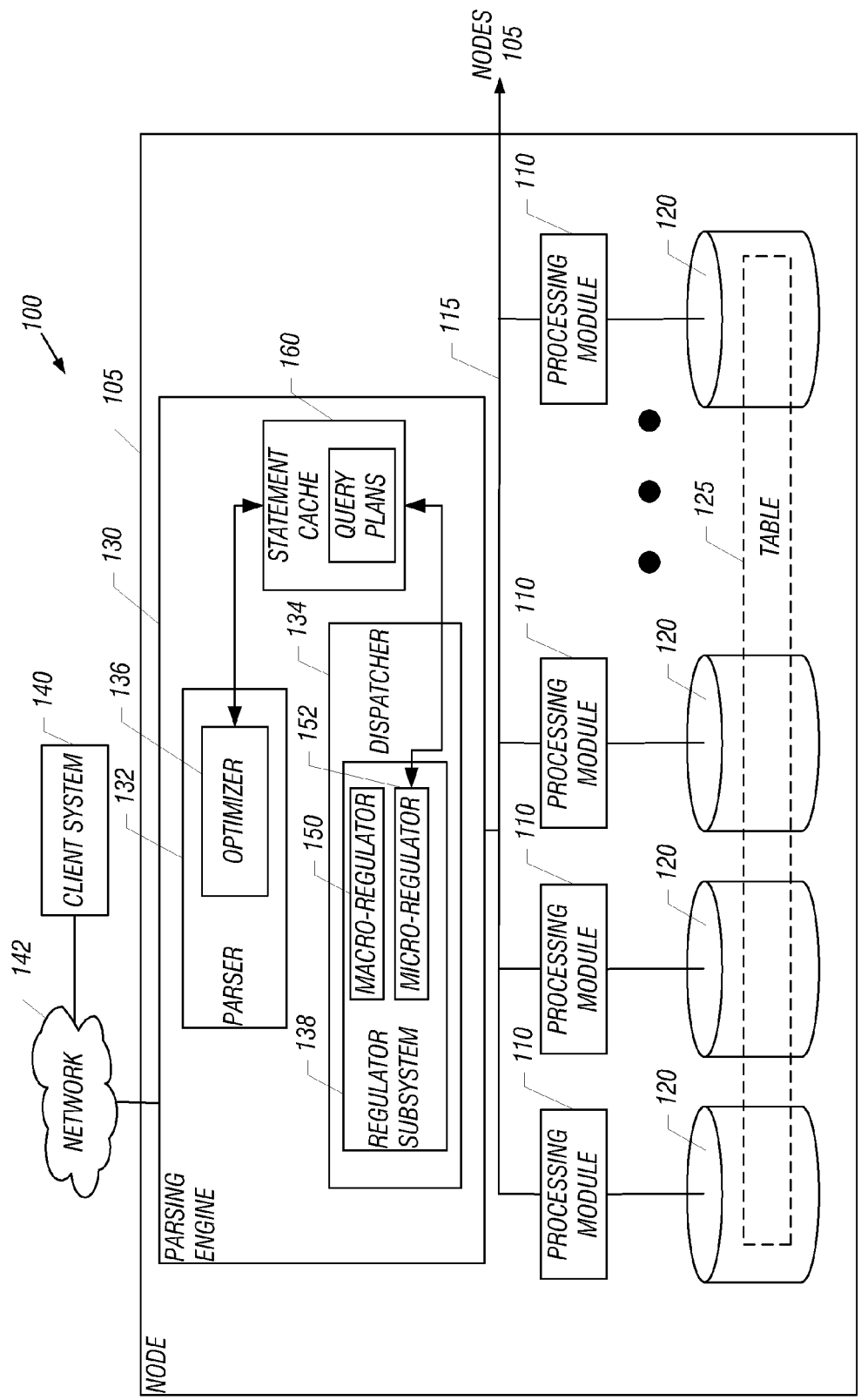
FIG. 1 is a block diagram of an exemplary database system that includes a regulator subsystem in accordance with an embodiment.

A database management system (or more simply, "database system") includes an optimizer that is able to provide resource estimates and a regulator subsystem that receives the resource estimates from the optimizer and dynamically adjusts the database system's performance knobs, such as by allocating database system resources using the resource estimates and service level goals (SLGs) as a guide. In one example, the performance knobs are referred to as priority scheduler knobs. When the priority scheduler knobs are adjusted, priority settings (resource access rates) assigned to a request are changed. Adjusting how these priorities are assigned modifies the way shared CPU (central processing unit), disk-based storage (e.g., magnetic or optical disk storage), memory, queue, cache, and/or network resources are allocated among requests.

In addition, according to some embodiments, as part of the operation of the regulator subsystem, the regulator subsystem is able to feed back statistics regarding execution of requests to the optimizer. Based on the feedback statistics, the optimizer will be able to improve its performance in producing resource estimates for future requests that are received for processing by the database system. In this manner, an improved optimizer is provided that is able to improve its ability to provide resource estimates for use by the regulator subsystem as requests are executed by the database system. In effect, resource prioritization (which defines priorities of how resources are assigned to competing requests) performed by the regulator subsystem is influenced based on past experience (by monitoring statistics associated with execution of requests and feeding back such statistics to the optimizer).

The statistics that are provided back to the optimizer are run-time statistics (for every step in the query plan) that indicate consumption of an operating resource of the database system. Run-time statistics are different from statistics relating to tables or databases stored in the database system, where examples of statistics relating to tables or databases include table cardinalities and estimated cardinalities, values of columns, and so forth, as they existed at the last statistics collection. Run-time statistics can include statistics relating to the actual table cardinalities and column values, consumption (usage) of a processing resource, an input/output (I/O) resource, a storage resource, a network resource, or other operating resource of the database system. Run-time statistics relating to consumption of an operating resource of the database system can also include a response time (or elapsed time) associated with execution of a request. Based on the feedback run-time statistics, the optimizer can improve its performance in generating resource estimates.

The resource estimates provided by the optimizer can be elapsed time estimates to provide an estimate of an expected amount of time for corresponding requests to complete. In addition, the resource estimates provided by the optimizer can be estimates of usage of other resources of the database system, including as examples, an estimate of usage of a processor resource, an estimate of usage of an input/output (I/O) resource, an estimate of usage of a storage resource, and an estimate of usage of a network resource. Since feedback information is provided from the regulator subsystem to the optimizer, the optimizer's estimates of usage can be improved.

The estimate of usage of the processor resource can indicate the expected number of cycles of one or more central processing units (CPUs) that execution of the request is expected to consume. The estimate of usage of the I/O resource can indicate the expected number of I/O accesses (e.g., read or write accesses of disk storage, for example) that execution of the request is expected to invoke. The estimate of usage of the network resource can indicate an amount of network traffic (such as traffic between different database nodes) that is expected in the execution of the request. The estimate of usage of storage resource can indicate an amount of memory or other storage (e.g., high-speed memory, cache memory, etc.) that the request is expected to consume in the execution of the request.

Dynamic adjustment of priority settings assigned to a request based on resource estimates provided by the optimizer is performed by the regulator subsystem in the context of attempting to meet performance goals (service level goals or SLGs) for each request, where the SLGs can be user-defined, for example. An 'SLG" or "service level goal" refers to a predefined set of one or more performance criteria that are to be satisfied during execution of a request. The SLG can be defined by a database administrator, for example. In some examples, an SLG can be any one or more of the following: a target response time; a target throughput; an enforcement policy (to specify that some percentage of queries are to finish in some predefined amount of time), and so forth. In a more specific example, the SLG for requests of a particular workload group can be "≤1 second @ 95," which means that each such request should execute within one second 95% of the time. Another example SLG can be "1,000 queries per hour."

The term "request" refers to a database query (e.g., Structured Query Language or SQL query) that is processed by the database system to produce an output result. Alternatively, a "request" can refer to a utility, such as a load utility to perform loading of data from a source to a target. A request can belong to one of multiple possible workloads in the database system. A "workload" (or alternatively "workload group") is a set of requests that have common characteristics, such as an application that issued the requests, a source of the requests, type of query, priority, response time goals, throughput, and so forth. A workload group is defined by a workload definition, which defines characteristics of the workload group as well as various rules associated with the workload group. A "multi-class workload" is an environment with more than one workload.

The workload groups may be divided into workload groups of different priorities. A low priority workload group may include low priority requests such as background load requests or reporting requests. Another type of workload group includes requests that have short durations but high priorities. Yet another type of workload group includes continuous or batch requests, which run for a relatively long time.

Automatically managing and adjusting assignment of database system resources (CPU, disk storage, memory, queue, cache, network, and so forth) to achieve SLGs for a complex multi-class workload is challenging because of the inter-dependence between workloads that result from their competition for shared resources.

In accordance with some embodiments, a database system is provided with a regulator subsystem in a "closed-loop" workload management architecture to satisfy SLGs. The closed-loop workload management architecture is an automated goal-oriented workload management system capable of supporting complex workloads and capable of self-adjusting to various types of workloads. The database system's operation has several major phases: (1) assigning incoming requests to workload groups, and assigning goals (called service level goals or SLGs) to the workload groups; (2) monitoring the execution of the workload groups against their goals; and (3) regulating (adjusting and managing) the workload flow and priorities to achieve the service level goals. The regulator subsystem according to some embodiments performs phases (1)-(3) identified above.

The regulator subsystem according to some embodiments includes a macro-regulator and a micro-regulator. In some implementations, the goal of the macro-regulator is to attempt to satisfy service level goals of all workloads (or stated differently, to achieve a "simultaneous solution" for all workloads), while the goal of the micro-regulator is to attempt to find a solution for every individual request in a workload independently while avoiding solutions for one workload that prohibits solutions for other workloads. Such an approach significantly simplifies the problem, finds solutions relatively quickly, and discovers a reasonable simultaneous solution in a large number of cases. While the macro-regulator provides control over response times at a coarse level (at the workload level), the micro-regulator will focus on individual requests.

The micro-regulator according to some embodiments receives resource estimates from a database system optimizer for each request and adjusts priority levels assigned to the request based on the resource estimates in an attempt to meet the SLG associated with the request.

The micro-regulator initially assigns, to a particular request, a first priority level that corresponds to a particular workload group to which the particular request belongs. Subsequently, at intermittent time intervals (or steps), the micro-regulator is able to change the priority level assigned to the particular request based on a monitored execution of the particular request and whether the particular request is anticipated to meet a service level goal. In setting the appropriate priority level for the particular request, the micro-regulator considers the resource estimates associated with the request that is received from the optimizer. For example, if the resource estimate is an elapsed time estimate indicating an expected amount of time required to complete execution of the request, then the micro-regulator can compare an amount of time consumed by execution of the request so far with the elapsed time estimate to determine the remaining amount of time that the request will need to complete, so that the micro-regulator can determine whether or not the request will complete in time to satisfy the corresponding SLG given the currently assigned priority level. The micro-regulator can also consider other resource estimates from the optimizer in making the above determination. In this manner, by considering the resource estimates, the micro-regulator can more intelligently determine what resources to assign to what requests, such that an unnecessary increase of the assigned priority level is not performed if the currently assigned priority level is sufficient. This will allow the micro-regulator to better budget resources allocated to respective requests.

FIG. 1 illustrates an exemplary database system 100 in which some embodiments of the invention can be incorporated. The database system 100 can include multiple nodes 105 (just one node depicted in FIG. 1). Each node 105 includes one or more processing modules 110 connected to a network 115. The processing modules 100 manage the storage and retrieval of data in respective data-storage facilities 120. Each of the processing modules 110 may be one or more physical processors or may be a virtual processor, with one or more virtual processors running on one or more physical processors.

Each processing module 110 manages a portion of a database that is stored in a corresponding one of the data-storage facilities 120. Each data-storage facility 120 includes one or more disk drives or other types of storage devices. The nodes 105 of the database system are interconnected by the network 115.

As depicted in FIG. 1, a table 125 is distributed across the data-storage facilities 120, where different rows 127 of the table 125 can be distributed across the data-storage facilities. In response to a request, one or more of the processing modules 110 can be instructed to retrieve corresponding rows from the table 125 to provide a result to the querying client (which can be one of the client systems 140).

The node 105 also includes a parsing engine 130, which has a parser 132 and a dispatcher 134. The parser 132 receives database queries (such as those submitted by client systems 140 over a network 142), parses each received query, and generates executable steps for the parsed query. The parser 132 includes an optimizer 136 that generates query plans in response to a query, selecting the most efficient from among the plural query plans. The dispatcher 134 sends the executable steps of the query plan generated by the parser 132 to multiple processing modules 110 in the node 105. The processing modules 110 execute the steps. If the query specifies retrieval of data from the table 125, then the retrieved data is sent back by the database system 100 to the querying client system 140 for storage or display at the client system 140 (which can be a computer, personal digital assistant, etc.).

The dispatcher 134 includes a regulator subsystem 138 according to an embodiment. Note that parts of the regulator subsystem 138 can also be in the processing modules 110 (not depicted), since the regulator subsystem 138 also monitors execution of requests, as discussed below. The regulator subsystem has a macro-regulator 150 and a micro-regulator 152. Note that each of the macro- and micro-regulators can be implemented with one or more software modules. In some cases, a particular software module can perform both tasks of the macro-regulator 150 and the micro-regulator 152

In embodiments with multiple parsing engines, each parsing engine can have a regulator subsystem.

As further shown in FIG. 1, the parsing engine 130 includes a statement cache 160, which contains information relating to query plans developed by the optimizer 136 for corresponding requests received by the parsing engine 130. The information relating to each query plan can include resource estimates (response or elapsed time estimate, and estimate of usage of resource) generated by the optimizer 136. When execution of a request or a request step is completed, then the corresponding query plan in the statement cache 160 can be updated with actual run-time statistics as collected by the regulator subsystem 138.

When a later request is received, then the optimizer 136 will access the statement cache 160 to determine whether a query plan already exists for the later-received request. If so,
the actual statistics that had previously been stored in the statement cache 160 will be retrieved to use as the resource estimates for the later-received request. However, if there is no match in the statement cache 160 for the later-received request, then the optimizer 136 will add another query plan entry in the statement cache 160, and generate resource estimates to provide to the regulator subsystem 138. Upon completion of the later-received request, the query plan entry can be updated with the statistics for future use.

In some implementations, each query plan in the statement cache 160 can be associated with a timestamp that indicates when the query plan is no longer valid and should be deleted or updated. The timestamp can be generated and updated by the regulator subsystem 138. When the optimizer 136 receives a request to develop a plan, the optimizer 136 will access the statement cache 160 to derive its resource estimates. Since the statement cache 160 is updated with actual run-time statistics, the optimizer 136 will be able to generate more accurate resource estimates when it accesses the statement cache 160 to derive resource estimates for future requests.

The statement cache 160 can be implemented in system memory or a cache memory. Alternatively, the statement cache 160 can be stored on persistent storage such as disk-based storage.

Figure 2:
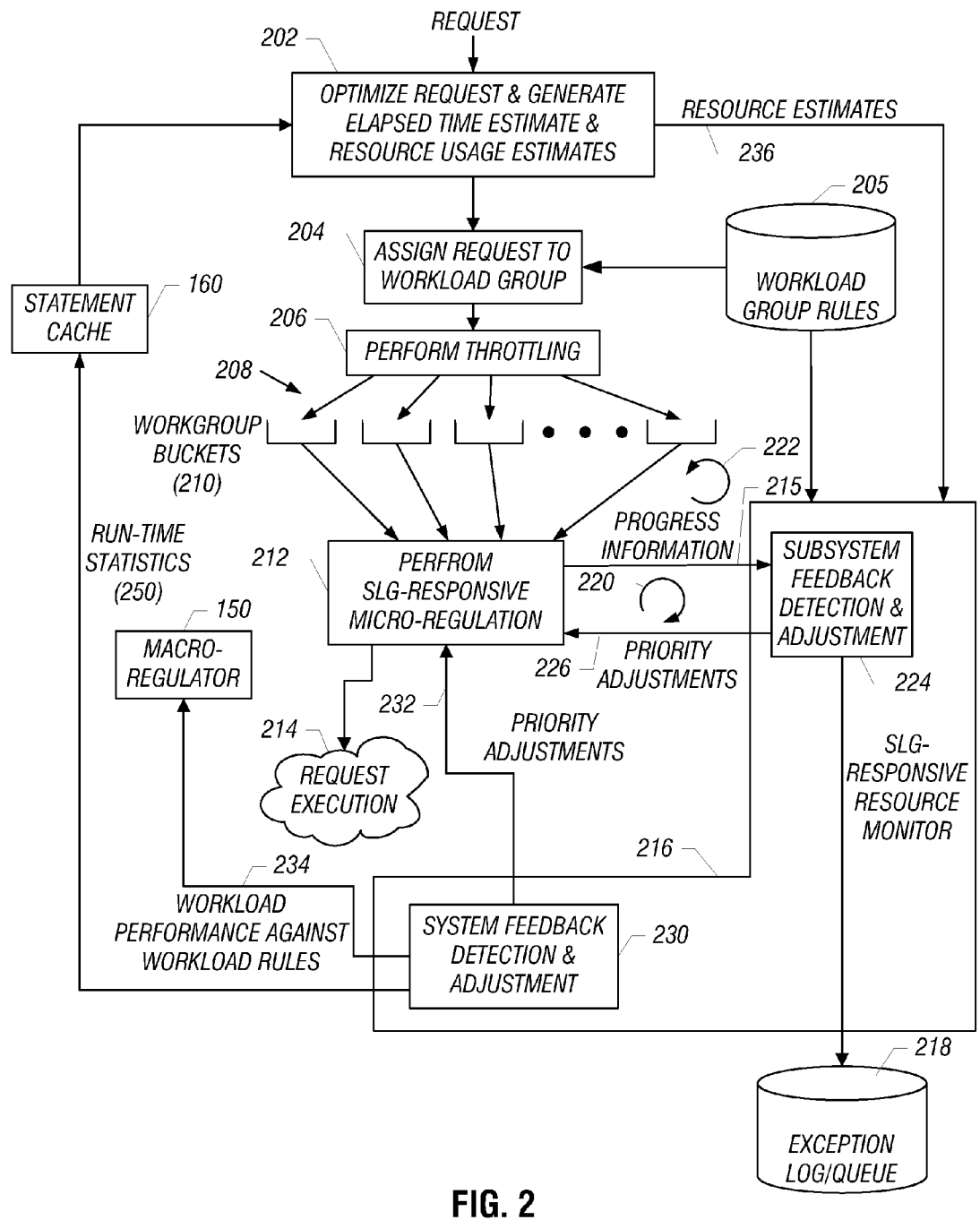
FIG. 2 is a flow diagram of a process of regulating workloads that includes providing feedback statistics to an optimizer to improve estimates provided by the optimizer, in accordance with an embodiment.

Operation of the regulator subsystem 138 is illustrated in more detail in FIG. 2. The regulator subsystem 138 dynamically monitors workload characteristics (defined by the optimizer 136) using request level metrics within a workload based on past and current performance of the system that guide two feedback mechanisms. The regulator subsystem 138 controls performance of execution of requests to achieve service level goals both before a request begins execution and at periodic intervals during query execution (the SLG-responsive element of the micro-regulation).

Prior to query execution, an incoming request is examined (at 202) by the optimizer 136. In generating query plans and selecting an optimal one of the query plans for submission to the processing modules 110 for execution, the optimizer 136 can generate an estimate of the response time (elapsed time) that provides an indication of how long the request should execute in the database system. Note that estimates can also be generated for every individual step of the request, and a sum of the estimates for the individual steps provides the estimate of the entire request. Moreover, in accordance with some embodiments, the optimizer 136 can generate other resource estimates, including estimates of processor usage, I/O usage, and network usage, for each step of the request. The optimizer can produce the estimates of CPU usage, I/O usage, storage usage, and network usage based on a cost model. For example, the optimizer 136 can retrieve information relating to the CPU capacity, which can be expressed in terms of millions of instructions per second (MIPS). Also, the optimizer 136, as part of its normal optimization tasks, can estimate the cardinalities of tables and intermediate spool files that are involved in execution of the request. Based on the estimated cardinalities and the CPU capacity, the optimizer 136 is able to estimate the CPU usage that is expected for execution of the request. The CPU usage estimate can be performed on a per-step basis for each step of the query plan. Note that different steps can access different tables or different parts of tables across different access modules in the system.

Similarly, the optimizer 136 can also retrieve information regarding memory size (size of high-speed memory that can be used to temporarily store data). Based on the memory size and the expected accesses of data in base tables and intermediate tables that will be involved in each step of a query plan, the optimizer 136 is able to estimate the expected I/O usage for each step. The I/O usage includes I/O accesses of disk storage (e.g., the number of block I/Os to read from or write to a table or index).

Moreover, the optimizer 136 is able to determine which data-storage facilities 120 store data involved in the execution of the request. For each step of the query plan, the optimizer 136 is able to estimate how much inter-processor module or inter-node traffic is expected—this will allow the optimizer 136 to estimate the network usage (usage of the network 115 of FIG. 1) is expected for each step.

In accordance with some embodiments, to improve its resource estimates (at 202), the optimizer 136 also accesses the statement cache 160. As discussed above, the statement cache 160 is updated with actual run-time statistics. In FIG. 2, the run-time statistics are provided (at 250) by an SLG-responsive resource monitor 216 (described further below). For any received request, if a previously-created query plan for the request already exists, then actual statistics for each step in the query plan in the statement cache 160 can be accessed to use as the resource estimates.

Based on the response time estimate, and/or based on other resource estimates (CPU usage, I/O usage, storage usage, and network usage), and/or based on other classification criteria for the workload, the micro-regulator 152 assigns (at 204) the request to one of the multiple workload groups that have been defined. The assignment is based on accessing workload group rules 205 (as defined by workload definitions) to match characteristics of the request as identified by the optimizer 136 with various workload definition rules. The workload group corresponding to the workload definition rules most closely matching the characteristics of the request is identified, where the incoming request is assigned to the identified workload group.

Next, the macro-regulator 152 performs throttling (at 206), where the macro-regulator 152 determines whether or not an incoming request is to be immediately scheduled for execution or whether the incoming request should be held for later execution. As part of the throttling performed at 206, the macro-regulator 152 can also consider concurrency levels—the maximum number of concurrent executing requests from each workload group. The macro-regulator 152 monitors the concurrency levels of the workload groups, and if the concurrency level of the corresponding workload group (that the incoming request is assigned to) is above a predefined threshold (which means that there are too many concurrent executing requests for this workload group), then the incoming request for that workload group waits in a queue for later execution until the concurrency level for this workload group subsides below the defined threshold.

In addition, the micro-regulator 152 can also, prior to execution of the incoming request, determine whether it would not be possible to satisfy the service level goal of the request. This can be determined based on the resource estimates provided by the optimizer 136 to the micro-regulator 152. The micro-regulator 152 can determine if, given the resource estimates from the optimizer for the request, that the SLG of the request cannot be satisfied. If this is the case, the request can be rejected or delayed. In other embodiments, it may also be possible to abort a request that has begun execution if the micro-regulator 152 later decides that the SLG of the request cannot be met based on the amount of resources consumed so far and on the remaining resources estimated by the optimizer. It is noted that whether or not rejection/abortion of the request should occur can be specified by a database administrator as part of the rules associated with the workload that the request is part of.

If an incoming request can be scheduled for immediate execution, the macro-regulator places (at 208) the incoming request into one of multiple workload group buckets 210 (as defined by corresponding workload definitions). The "buckets" 210 can be execution queues that contain requests scheduled for execution.

Next, the micro-regulator performs SLG-responsive micro-regulation (at 212) at the request level. The micro-regulator 152 selects a request from one of the buckets 210, in an order determined by the enforcement priority associated with each of the workload groups, and executes (214) the selected request.

The SLG-responsive micro-regulation task 212 performed by the micro-regulator 152 includes adjusting the assignment of system resources for an individual request by adjusting a priority level (also referred to as a "resource access rate") of the request. In this way, service level impacts for requests that are part of high priority workload groups can be reduced. Increasing the resource access rate for a request means that the request would be granted more frequent access to one or more database system resources (e.g., CPU, I/O, network, etc.).

The SLG-responsive micro-regulation 212 can also include lowering the priority level (resource access rate) of an individual request based on its workload group assignment and associated service level goal to free up system resources.

As part of the SLG-responsive micro-regulation 212, the micro-regulator 152 monitors execution of the request and reports (at 215) progress information, for example, for each request and for each workgroup, to an SLG-responsive resource monitoring module 216 (which is also part of the regulator subsystem 138 of FIG. 1). The SLG-responsive resource monitoring module 216 performs (at 224) feedback detection and adjustment, which includes comparing the progress information from the micro-regulator 152 with workload rules 205 and stores any exceptions (e.g., throughput deviations from the workload rules) in an exception log/queue 218. Based on the comparison, the SLG-responsive resource monitoring module 216 provides (at 226) priority level (resource access rate) adjustments to the SLG-responsive micro-regulation task 212, which adjusts system priority (resource access rates) accordingly. Note that the part of the SLG-responsive resource monitor 216 that considers the progress information and provides the priority adjustments can be considered to be part of the micro-regulator 152.

The adjustment of resource access rates is performed for a request based on the micro-regulator determining whether or not execution of the particular request is meeting the service level goal. "Dynamically" increasing or decreasing (adjusting) the priority level assigned to the particular request means that the adjustment is made based on receiving feedback regarding the execution of the request and whether or not the service level goal will be met. In a more specific embodiment, the micro-regulator can exponentially increase (or otherwise adjust) the priority level assigned to the particular request if the micro-regulator determines that execution of the particular request is struggling to meet the service level goal. "Exponentially" increasing the priority level assigned to a request means that a priority level is assigned according to the following relationship:

$$\text{Priority Level} = c \cdot b^i,$$

where c is a predefined constant, b is a base (which can be the exponent e or a positive real number), and i is an adjustable number increased by the micro-regulator to exponentially increase the priority level assigned to the request.

More generally, the micro-regulator is able to increase (or otherwise adjust) the priority level assigned to a request in a non-linear manner to increase the likelihood of a request meeting a service level goal. Another example of non-liner increases of priority levels involves an $i^m$ relationship, where m>1, and i is increased to non-linearly increase the assigned priority level. Note that if m is equal to one, then adjusting i to increase the assigned priority level would result in a linear increase. In other embodiments, other types of dynamic variation of priority levels can be performed.

In performing the priority level adjustments, the SLG-responsive resource monitoring module 216 also considers resource estimates (e.g., elapsed time estimates, processor usage estimates, I/O usage estimates, storage usage estimates, and network usage estimates) that are provided (236 in FIG. 2) by the optimizer 136, as discussed above. In some embodiment, the resource estimates provided by the optimizer 136 include resource estimates provided for each step of a plan (also referred to as a "query plan") generated by the optimizer for executing the request. A query plan can specify multiple steps, where the steps can call for access (read and/or write) of data in specific database tables, access of data in spools, calculations (e.g., joins, determination of whether predicates are satisfied), and so forth. The query plan can also specify that some of the steps are to be performed by multiple processing modules 110 in one or multiple database nodes 105 (FIG. 1). In addition to this steps can also be run concurrently.

The SLG-responsive resource monitor 216 is able to consider, at each step of the query plan associated with the request, whether the progress information for execution of the request so far that is received from the SLG-responsive micro-regulation task 212 is consistent with the resource estimates provided for the respective steps of the query plan. For example, the optimizer 136 can estimate that at the end of step 2, 10 CPU cycles are expected to have been consumed by execution of the request. However, the progress information from the SLG-responsive micro-regulation task 212 can indicate that execution of the request has actually consumed 40 CPU cycles at the end of step 2. The SLG-responsive resource monitor 216 may use this as an indication that the currently assigned priority level will not be sufficient to satisfy the SLG for the request. If so, the SLG-responsive resource monitor 216 can specify that the assigned priority level be increased such that more processor resources are assigned to the request to increase the likelihood that execution of the request will be performed according to the corresponding SLG.

More generally, the SLG-responsive monitor 216 can determine, from the progress information, whether consumption of a resource is greater than or less than a corresponding resource estimate provided by the optimizer for a particular one of the plurality of steps. Adjustment of the priority level of the request for each corresponding step is based on the above determination.

As an example, if the optimizer plans for 5 steps each taking one minute with priority of X—but the actual execution of the first step takes 2 minutes instead of one, then the micro-regulator will raise the priority of execution for the remaining steps to at least (4/3)X.

The feedback detection and adjustment 224 is performed at a subsystem level, wherein a "subsystem" can refer to the part of the database system 100 corresponding to one dispatcher 134 (FIG. 1). In addition, further feedback detection and adjustment 230 performed by the SLG-responsive resource monitor 216 can also be performed at the system level (where "system" refers to the entire database system in one embodiment). The system feedback detection and adjustment 230 also provides (at 232) priority level adjustments to the micro-regulation task 212. The system detection and adjustment 230 also provides (at 234) data regarding workload performance (at the system level) against workload rules back to the macro-regulator 150.

The micro-regulator 152 is able to make a decision to assign a particular priority level (in response to the adjustment information provided at 226 and 232 by the SLG-responsive resource monitoring module 216) at each of multiple time intervals. In another words, at periodic or intermittent time intervals (e.g., one second or less, such as milliseconds or microseconds), the micro-regulator 152 is able to adjust the priority level of the request. By setting the intermittent time intervals relatively short, more frequent adjustment of priority levels during execution of a particular request can be performed.

As part of the SLG-responsive micro-regulation task (212), if the micro-regulator 152 determines that the request will never meet the respective service level goal, then the micro-regulator 152 can make a decision to allow the request to miss the SLG. More generally, a prioritization can be provided of which requests get bumped out of their SLGs (are allowed to miss their SLGs), when insufficient processing budget exists. If it is determined that, due to the current resource demands and mix of requests running in the database system, that all SLG-responsive requests cannot be met, then the prioritization noted above can dictate that requests associated with higher-enforcement-priority workloads will be less likely to miss their SLGs than those requests associated with lower-enforcement-priority workloads. This is because each request associated with an SLG-responsive workload begins with an access rate appropriate to its base enforcement priority, and is increased proportionally from that base in the event the SLG might be missed. Also, those workloads not subject to SLG-responsive prioritization would be more likely affected because their requests will not experience any access rate increases at all.

As can be seen in FIG. 2, the system provides two feedback loops, indicated by the circular arrows 220 and 222. The first feedback loop (220) includes the micro-regulator 152 and the SLG-responsive resource monitoring module 216. In this first feedback loop (220), the system monitors on a short-term basis the execution of requests (within a workload) to detect deviations greater than a short-term threshold from the defined service level for the workload group to which the requests were defined. If such deviations are detected, the regulator subsystem adjusts the assignment of priority level to requests.

The second feedback lop (222) includes the macro-regulator 150, the micro-regulator 152, and the SLG-responsive resource monitoring module 216. In this second feedback loop, the system monitors on a long-term basis to detect deviations from the expected level of service greater than a long-term threshold. If it does, the system adjusts the execution of requests, e.g., by changing to another workload group, delaying, swapping out or aborting requests, to better provide the expected level of service for those requests that legitimately require that level of service. Monitoring on a long-term basis may include logging the deviations greater than the long-term threshold in an error log (such as log 218 in FIG. 2) or to a system queue table for asynchronous communication.

Another feedback loop is the optimizer feedback loop, in which the SLG-responsive resource monitor 216 collects actual statistics (e.g., elapsed time, usage of processing resource, usage of I/O resource, usage of storage resource, actual cardinalities and column values, and/or usage of network resource), and provides such statistics (at 250) to update resource estimates associated with a corresponding query plan in the statement cache 160.

By providing actual statistics associated with execution of a request back to the optimizer 136, tighter integration is achieved between the regulator subsystem 138 and the optimizer 136 can be achieved such that the optimizer 136 can provide more accurate resource estimates.

Figure 3:
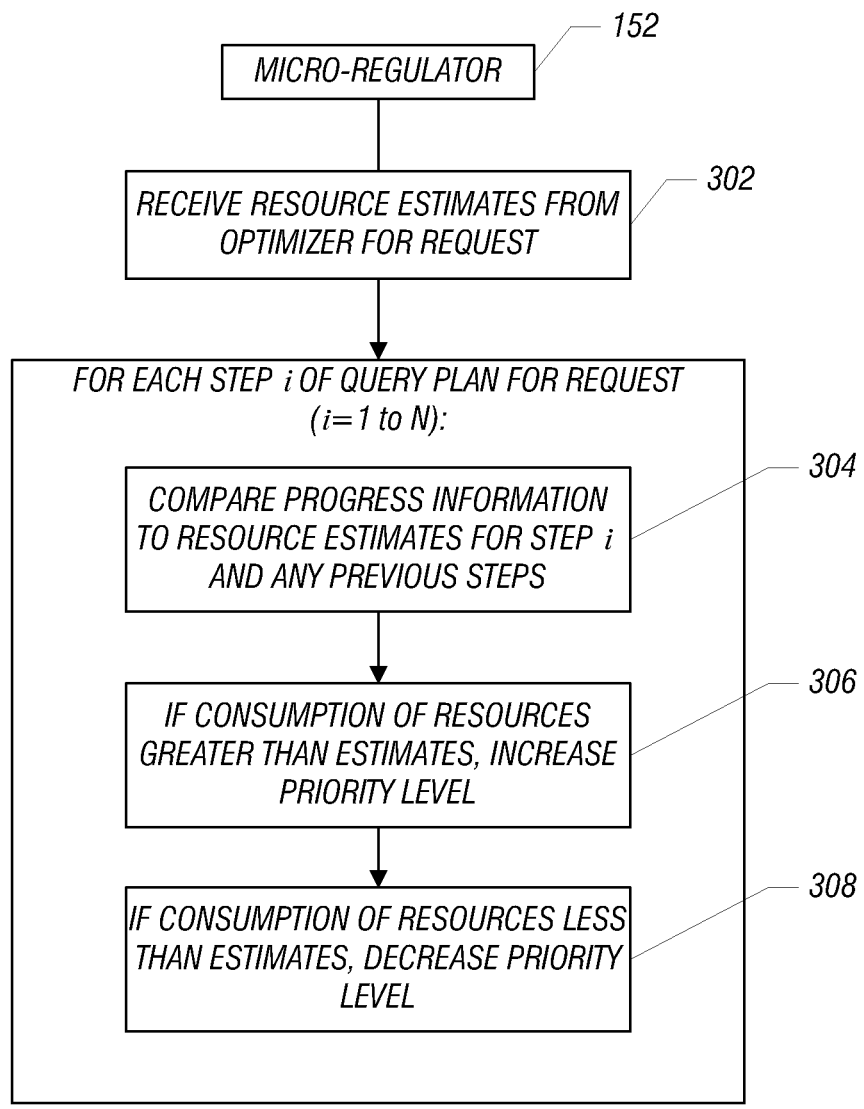
FIG. 3 is a flow diagram of a micro-regulation task according to some embodiments.

FIG. 3 illustrates tasks performed by the micro-regulator 152 in accordance with some embodiments. The micro-regulator 152 receives (at 302) resource estimates from the optimizer 136 for a particular request that is being executed by the database system. The resource estimates from the optimizer 136 includes resource estimates for each of multiple steps of a query plan produced by the optimizer for the request.

Then, for each step i of the query plan for the request, where i starts at one and increments to N (N representing the number of steps of the query plan), the micro-regulator 152 compares (at 304) progress information collected based on monitoring execution of the request with resource estimates for step i and any previous steps.

If the consumption of the resources is determined to be greater than the resource estimates up to step i provided by the optimizer 136, then the micro-regulator 152 can increase (at 306) the assigned priority level to the request. On the other hand, if the consumption of resources is determined to be less than the resource estimates up to step i provided by the optimizer 136, then the micro-regulator 152 can decrease (at 308) the assigned priority level to the request.

Figure 4:
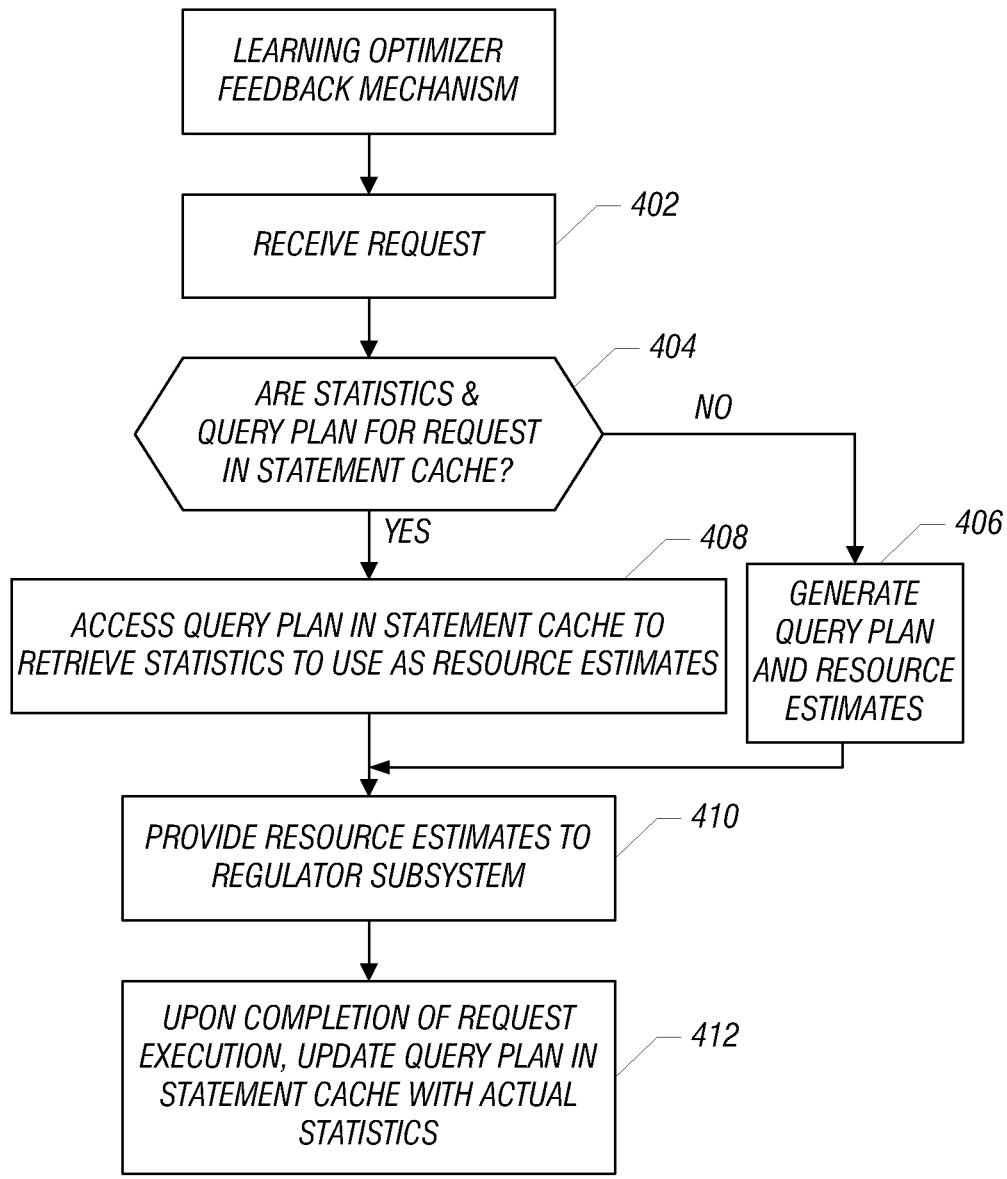
FIG. 4 is a flow diagram of an optimizer feedback mechanism, according to an embodiment.

FIG. 4 is a flow diagram of a process of an optimizer feedback mechanism according to some embodiments. A request is received (at 402) by the optimizer 136. The optimizer 136 determines (at 404) whether a previously-created query plan for the request already exists in the statement cache 160. If not, then the optimizer 136 will generate (at 406) resource estimates. However, if a previously-created query plan does exist in the statement cache 160, then the optimizer 136 retrieves (at 408) run-time statistics associated with the query plan to use as the resource estimates for the presently-received request.

In either case (406 or 408), the optimizer 136 provides (at 410) resource estimates to the regulator subsystem 138. Upon completion of the request execution, the query plan in the statement cache 160 corresponding to the presently-received request is updated (at 412) with actual run-time statistics collected by the regulator subsystem 138 for the request.

Using a mechanism according to some embodiments, the database system will be able to accept performance goals (service level goals) for workload groups and dynamically adjust the database system's performance knobs using the goals as well as resource estimates provided by the optimizer as guides. The resource estimates provided by the optimizer can be made more accurate by using an optimizer feedback mechanism in which actual run-time statistics associated with execution of a request are fed back to the optimizer for future use. Given performance objectives for each request in a workload, the database system will be able to find a knob setting that achieves the goal for one workload and at the same time makes it possible to achieve the goal for the other workloads. In other words, the ability to dynamically manage workloads (dynamically manage and adjust system resources by workload demands) achieves a set of response time goals. A benefit provided by some embodiments is that consistent response times can be delivered to users.

The various tasks discussed above can be performed by software, such as software implementing the optimizer 136 and regulation subsystem 138 (FIG. 1). Instructions of such software are loaded for execution on a processor, which includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A database system comprising:
a physical storage device configured to store a database, an optimizer module, and a regulator module;
at least one physical processor in communication with the storage device,
wherein the optimizer module is executable by the at least one physical processor to cause the at least one physical processor to generate resource estimates regarding execution of a request in the database system,
wherein the request is configured to include at least one operation to be performed on the database,
wherein the request is one of a plurality of requests included in a workload,
wherein each of the plurality of requests includes a respective priority level,
wherein the at least one physical processor is configured to set each respective priority level to a respective initial priority level upon receipt of the request,
wherein a regulator module is executable by the at least one physical processor to cause the at least one physical processor to monitor execution of the request and to adjust the respective priority level from the respective initial priority level of the request during execution of the request,
wherein adjustment of the respective priority level is based on the monitored execution and based on the resource estimates, and
wherein the regulator module is further executable by the at least one physical processor to cause the at least one physical processor to feed back run-time statistics for the request or query plan regarding execution of the request be used by the at least one physical processor during execution of the optimizer module to improve accuracy of resource estimates.

2. The database system of claim 1, wherein the statistics that are fed back comprise run-time statistics that relate to consumption of at least one resource.

3. The database system of claim 2, wherein the run-time statistics comprise one or more of an elapsed time, usage of a processor resource during execution of the request, usage of an input/output resource during execution of the request, usage of a storage resource during execution of the request, and usage of a network resource during execution of the request.

4. The database system of claim 1, further comprising a cache to store query plans, wherein the run-time statistics are fed back through an update of a corresponding one of the query plans for the request with the statistics.

5. The database system of claim 4, wherein the optimizer module is further executable by the at least one physical processor to cause the at least one physical processor to:
receive a second request;
determine whether a second query plan that corresponds to the second request exists in the cache; and
in response to the determination that the second query plan that corresponds to the second request exists in the cache, access statistics associated with the corresponding second query plan that are stored in the cache and provide the accessed statistics as resource estimates.

6. The database system of claim 5, wherein the optimizer module is further executable by the at least one physical processor to cause the at least one physical processor to, in response to determining that the second query plan that corresponds to the second request is not present in the cache, generate resource estimates for the second.

7. The database system of claim 1, wherein the resource estimates are selected from the group consisting of an elapsed time estimate, an estimate of usage of a processor resource, an estimate of usage of an input/output resource, an estimate of usage of a storage resource, and an estimate of usage of a network resource.

8. The database system of claim 7, wherein the estimate of usage of the processor resource comprises an estimate of usage of one or more central processing units (CPUs) provided in one or more database nodes of the database system, wherein the estimate of usage of the input/output resource comprises an estimate of a number of accesses of a disk-based storage, the estimate of usage of the storage resource comprises an estimate of an amount of storage, and the estimate of usage of the network resource comprises an estimate of an amount of data to be communicated over a network between processing modules of the database system.

9. The database system of claim 1, wherein the resource estimates comprise an elapsed time estimate to indicate an expected amount of time for completion of the request, and wherein the regulator module is further executable by the at least one physical processor to cause the at least one physical processor to determine whether execution of the request is expected to meet the elapsed time estimate.

10. The database system of claim 9, wherein the regulator module is further executable by the at least one physical processor to cause the at least one physical processor to increase the respective priority level in response to a determination that execution of the request is behind schedule as specified by the elapsed time estimate.

11. The database system of claim 9, wherein the regulator module is further executable by the at least one physical processor to cause the at least one physical processor to decrease the respective priority level in response to a determination that execution of the request is ahead of schedule as specified by the elapsed time estimate.

12. The database system of claim 1, wherein the regulator module is further executable by the at least one physical processor to cause the at least one physical processor to determine whether execution of the request will meet a service level goal (SLG) based on consideration of the resource estimates, and to adjust the respective priority level of the request further based on the SLG.

13. The database system of claim 1, wherein the optimizer module is further executable by the at least one physical processor to cause the at least one physical processor to:
provide the query plan for the request, wherein the query plan includes a plurality of steps; and
provide resource estimates for each of the plurality of steps of the query plan, wherein the regulator module is further executable by the at least one physical processor to cause the at least one physical processor to adjust the respective priority level of the request in response to a comparison of the resource estimates for each of the plurality of steps with progress information of execution of the request.

14. The database system of claim 13, wherein the regulator module is further executable by the at least one physical processor to cause the at least one physical processor, from the progress information, determine whether consumption of a resource is greater than or less than a corresponding resource estimate provided by the at least one physical processor based on execution of the optimizer module for a particular one of the plurality of steps, wherein adjustment of the respective priority level of the request is based on the determination.

15. A method executed by at least one physical processor in a database system, comprising:
receiving a request, wherein the request is configured to include at least one operation to be performed on a database of the database system, wherein the request is one of a plurality of requests included in a workload;
setting a respective priority level of each of the requests to a respective initial priority level;
generating, using an optimizer executable by the at least one processor, resource estimates for execution of the request;
regulating execution of the request in the database system using a regulator executable by the at least one processor, wherein regulating execution of the request comprises:
monitoring execution of the request; and
adjusting the respective priority level of the request from the respective initial priority level during execution of the request based on the monitored execution and based on the resource estimates; and
upon completion of the request, feeding back run-time statistics collected by the regulator subsystem to the optimizer.

16. The method of claim 15, wherein the run-time statistics are selected from the group consisting of an elapsed time estimate, an estimate of usage of a processor resource, an estimate of usage of an input/output resource, an estimate of usage of a storage resource, and an estimate of usage of a network resource.

17. The method of claim 15, wherein feeding back the run-time statistics to the optimizer comprises providing the run-time statistics to a cache that stores query plans accessible by the optimizer.

18. The method of claim 17, further comprising:
receiving a second request;
determining whether a query plan corresponding to the second request is present in the cache;
if the corresponding query plan is in the cache, accessing run-time statistics in the corresponding query plan to use as resource estimates for the second request provided to the regulator subsystem; and
if the corresponding query plan is not in the cache, generating resource estimates for the second request.

19. The method of claim 15, wherein regulating execution of the request further comprises determining whether execution of the request will meet a service level goal (SLG) based on considering the resource estimates, and adjusting the respective priority level of the request further based on the SLG.

20. The method of claim 15, further comprising:
providing a query plan for the request with the optimizer, wherein the query plan includes a plurality of steps;
providing resource estimates with the optimizer for each of the plurality of steps of the query plan, wherein adjusting the respective priority level of the request is in response to comparing the resource estimates for each of the plurality of steps with progress information of execution of the request, and wherein regulating execution of the request further comprises:
from the progress information, determine whether consumption of a resource is greater than or less than a corresponding resource estimate provided by the optimizer for a particular one of the plurality of steps, wherein adjusting the respective priority level of the request is based on the determining.

21. A non-transitory computer-readable medium encoded with computer-executable instructions, the computer-executable instructions executable by a processor to cause the processor to:
receive a request, wherein the request is configured to include at least one operation to be performed on a database in a database system, wherein the request is one of a plurality of requests included in a workload, and wherein each of the plurality of requests includes a respective priority level initially set to a respective initial priority level; and
generate, using an optimizer, resource estimates for execution of the request;
regulate execution of the request in the database system using a regulator subsystem, regulation of execution of the request further causes the processor to:
monitor execution of the request; and
adjust the respective priority level of the request from the respective initial priority level during execution of the request, wherein adjustment of the respective priority level is based on the monitored execution and based on the resource estimates; and
upon completion of the request, feed back run-time statistics collected by the regulator subsystem to the optimizer.

22. The non-transitory computer-readable medium of claim 21, wherein upon execution of the plurality of instructions the processor is further caused to:
receive a second request;
determine whether a query plan corresponding to the second request is present in a cache;
if the corresponding query plan is in the cache, access run-time statistics in the corresponding query plan to use as resource estimates for the second request provided to the regulator subsystem; and
if the corresponding query plan is not in the cache, generate resource estimates for the second request.

* * * * *